United States Patent [19]
Ogihara et al.

[11] 4,299,380
[45] Nov. 10, 1981

[54] SHEET FEED APPARATUS

[75] Inventors: Masato Ogihara, Sagamihara; Toshihiko Misawa, Kawasaki; Takaji Sue, Sagamihara, all of Japan

[73] Assignee: Ricoh Company, Ltd., Japan

[21] Appl. No.: 115,140

[22] Filed: Jan. 24, 1980

Related U.S. Application Data

[63] Continuation of Ser. No. 883,511, Mar. 6, 1978, abandoned.

[30] Foreign Application Priority Data

Mar. 9, 1977 [JP] Japan .................................. 52-25667

[51] Int. Cl.$^3$ .............................................. B65H 3/44
[52] U.S. Cl. .......................................... 271/9; 271/11; 271/107; 271/164; 358/296
[58] Field of Search .................. 271/9, 107, 132, 11, 271/164; 358/296

[56] References Cited

U.S. PATENT DOCUMENTS

| | | | |
|---|---|---|---|
| 3,635,159 | 1/1972 | Keeler | 101/232 |
| 3,817,515 | 6/1974 | Kanda | 271/9 |
| 4,017,181 | 4/1977 | Komaba | 271/9 |
| 4,025,066 | 5/1977 | Sue | 271/9 |

Primary Examiner—Richard A. Schacher
Attorney, Agent, or Firm—McGlew and Tuttle

[57] ABSTRACT

A sheet feed apparatus for use with facsimile apparatus comprising an original table for inserting original sheets manually, a recording sheet cassette for holding a stack of recording sheets therein, sheet feed roller means disposed so as to be capable of receiving both original sheets and recording sheets to transport them individually to a reading and printing station of the facsimile apparatus, and sheet feed means for automatically separating recording sheet individually from a stack of recording sheets in the cassette.

11 Claims, 35 Drawing Figures

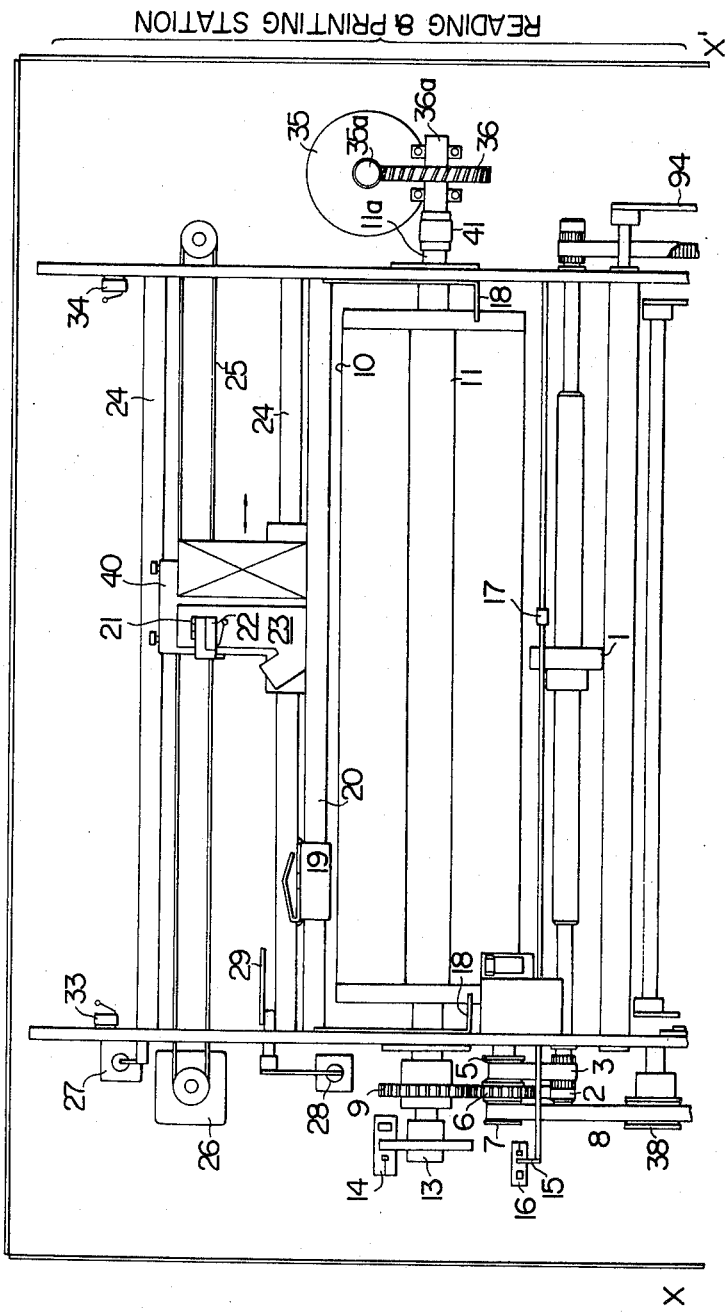

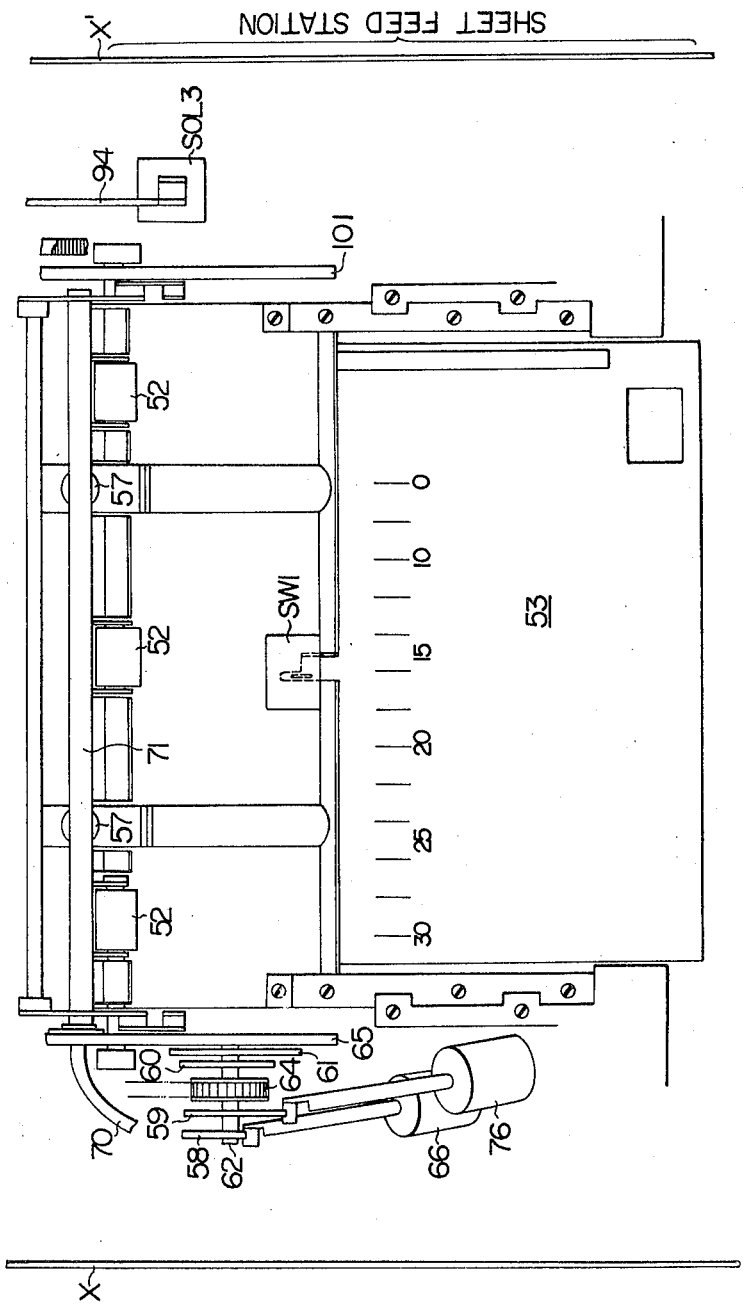

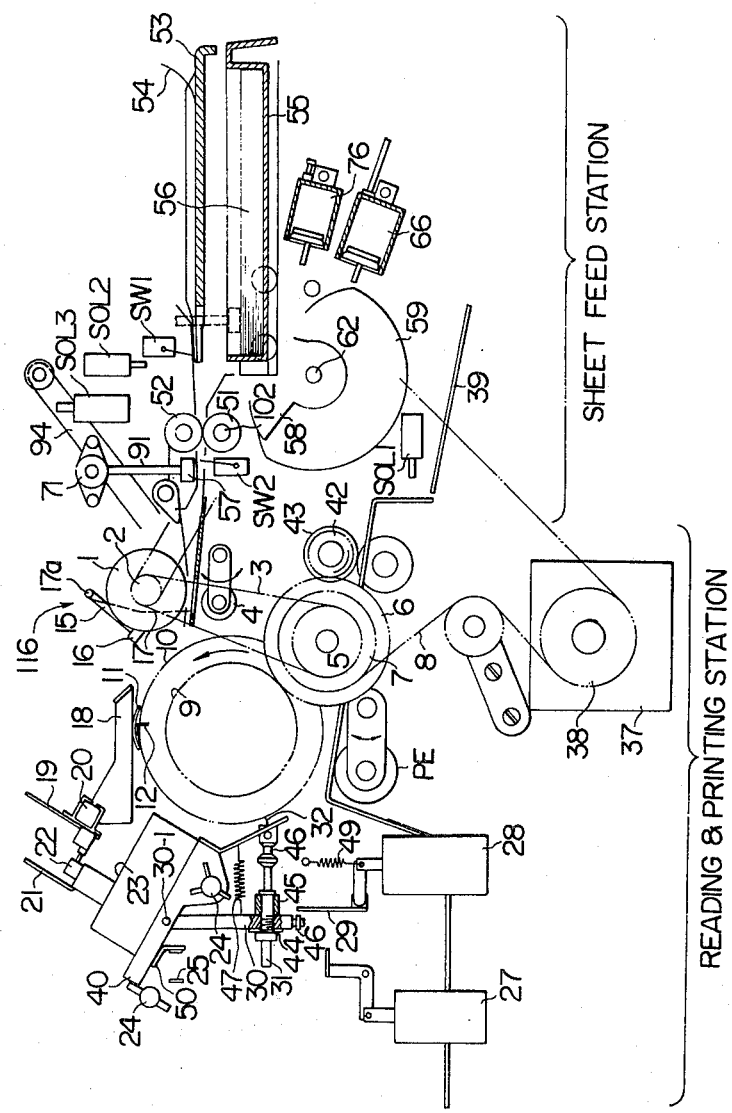

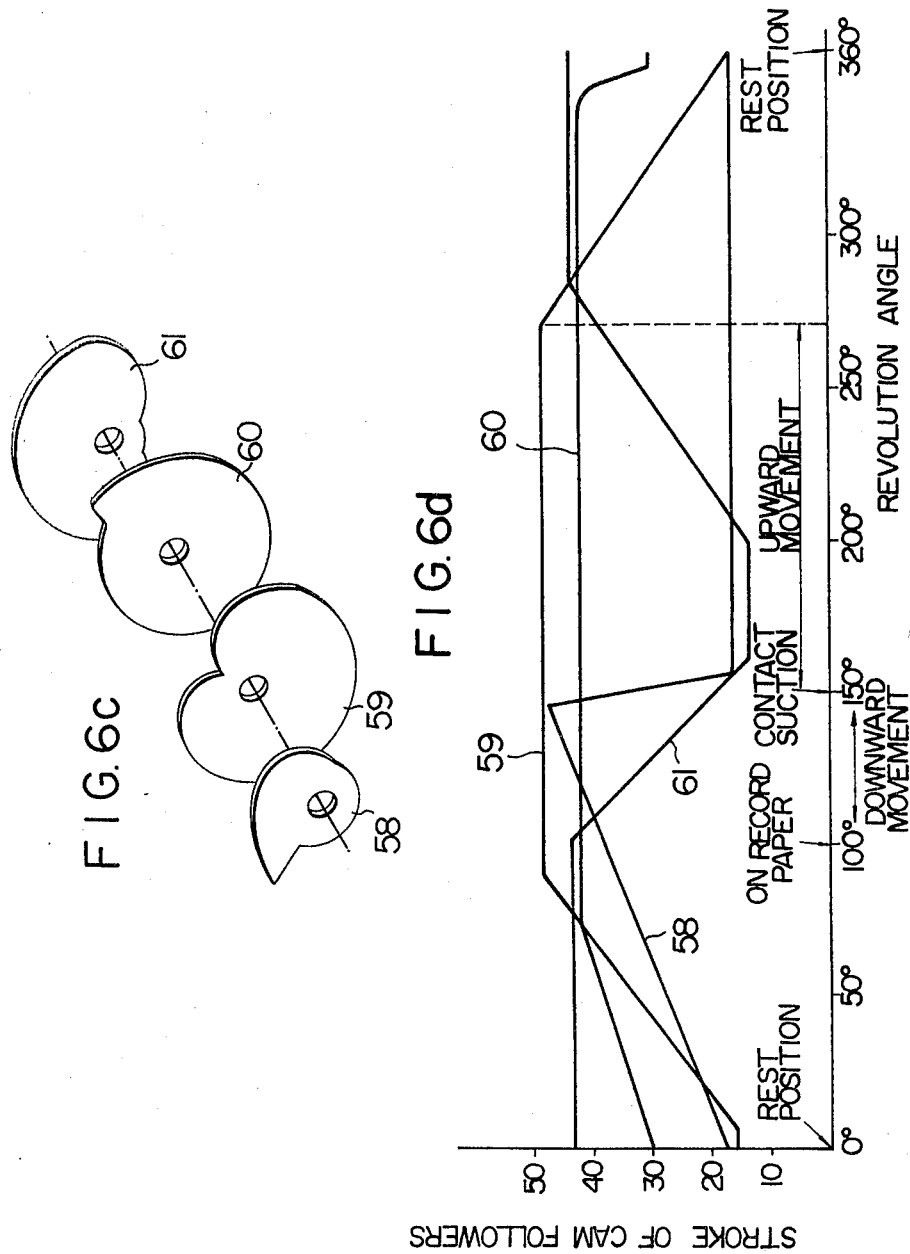

SHEET FEED APPARATUS

This is a continuation of application Ser. No. 883,511 filed Mar. 6, 1978, now abandoned.

BACKGROUND OF THE INVENTION

The present invention relates to a facsimile apparatus, and more specifically to a sheet feed apparatus for use with a facsimile apparatus.

In a conventional type facsimile apparatus, a scanner and a printer have an independent construction. In such a facsimile apparatus, both the scanner and the printer have an original sheet setting station and a recording sheet setting station, and original sheets and recording sheets are transported through different routes. Such construction makes the conventional facsimile apparatus oversized. Therefore, in making the facsimile apparatus simpler in mechanism and more compact in size, it is desirable to use the scanner as the printer as well.

SUMMARY OF THE INVENTION

It is therefore a primary object of the present invention to provide a sheet feed apparatus capable of making a facsimile apparatus simpler in mechanism and more compact in size.

Another object of the invention is to provide a sheet feed apparatus for use with such a compact facsimile apparatus whose scanner is used as a printer as well.

In order to attain the above-mentioned objects, in the present invention, a sheet feed apparatus is provided which comprises a sheet separating apparatus by air suction and a pair of feed rollers, and an original table is disposed above a cassette for holding original sheets therein. Original sheets and recording sheets are fed from the original table and the cassette to the same feed rollers, and the original sheets are manually fed and the recording sheets are automatically fed by the air suction sheet separating apparatus.

By such construction, it becomes possible to use the original feed rollers as the recording sheet feed rollers as well. Moreover, by feeding the original sheets manually, troubles which might be caused by the variation of the quality of each original in automatic feeding of the originals are obviated.

BRIEF DESCRIPTION OF THE DRAWINGS

FIGS. 1a and 1b are a schematic plan view of a main portion of a facsimile apparatus employing a sheet feed apparatus of the invention; particularly FIG. 1a shows a reading and printing station of the facsimile apparatus and FIG. 1b shows a sheet feed station thereof.

FIG. 2 is a schematic side elevation of FIGS. 1a and 1b, wherein only the main portion of the facsimile apparatus is shown.

FIGS. 6a, 6b and 6c are a schematic sectional side elevation and a perspective exploded view of the main portions of the air suction sheet separating apparatus.

FIG. 6d is a diagram of the lift of each cam employed in FIG. 6c.

FIG. 11a is a schematic sectional side elevation of a vacuum pipe and the sheet suction head, and FIG. 11b is a partial cutaway front elevation of FIG. 11a. FIGS. 12a and 12b are a section taken on line XII—XII in FIG. 11b.

FIG. 15b is a schematic sectional side elevation of the clutch for the separation rollers of FIG. 15a.

FIG. 18b is a partial sectional front elevation of the cassette of FIG. 18a.

DETAILED DESCRIPTION OF THE PREFERRED EMBODIMENTS

Figure 3:
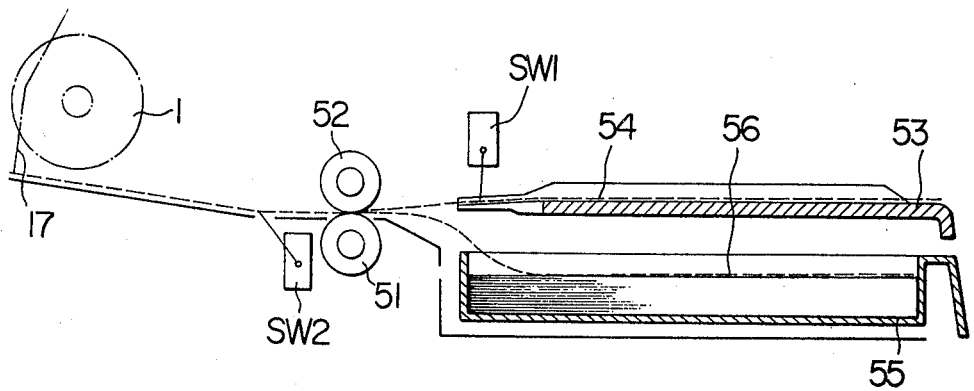
FIG. 3 is a schematic partial side elevation of the original sheet feed apparatus and recording sheet feed apparatus of the facsimile apparatus of FIGS. 1a and 1b.

For a better understanding of the present invention, an example of a facsimile apparatus in which the invention is to be employed is outlined first by referring to FIGS. 1a, 1b and 2.

FIGS. 1a and 1b are a partial plan view of an embodiment of a facsimile apparatus of the invention. A whole plan view of the facsimile apparatus can be obtained by combining FIGS. 1a and 1b.

FIG. 2 is a schematic sectional side elevation of the facsimile apparatus. The facsimile apparatus shown in the figures is of the type in which at the time of transmission, an original sheet is wrapped around a drum 10 and picture information of the original sheet is read by a conventional readout head 23, while at the time of reception a recording sheet is wrapped around the drum 10 and recording is made on the recording sheet by a recording stylus 32 (refer to FIG. 2), and both the readout head 23 and the recording stylus 32 are supported on a sub-scanning base 40. The recording process employed in this apparatus is of an electrolytic recording type. The recording sheet to be employed, for example, consists of a carbon layer coated on a base paper, and a metallic layer (amine layer) coated thereon and a thin top coat applied thereon.

Visual recording is made by the recording stylus in contact with the top coat, with approximately 100 volts of voltage applied to the recording paper to decompose and burn off the top coat and the metallic layer, so that a mark is produced by exposing the carbon layer under the top coat and the metallic layer.

Transmission

Referring to FIG. 2, an original sheet to be transmitted is set at a manual sheet feeding table 53 by the operator, and the original sheet is automatically wrapped around the drum 10 by a sheet transfer process as will be discussed later. When the sheet transfer step is over, the drum 10 is rotated at a transmission speed. This is the main scanning. Cooperating with this, the sub-scanning base 40 carrying the optical reading head 23 thereon is moved along guide means 24 through a belt 25 by a sub-scanning motor 26 for use in the sub-scanning. This is the sub-scanning. The reading step for transmission consists of the above-mentioned main scanning and sub-scanning. When the transmission has been completed, the original sheet is discharged and is stacked on a sheet discharge tray 39. The sub-scanning base 40 is automatically returned to its starting position.

Reception

A stack of the recording sheets is held in a cassette which will be described later in detail. The recording sheets are individually separated from the stack of the sheets and transported by a sheet-feeding mechanism. Hereafter, the sheet transfer step is the same as that in the case of the transmission, provided that, in the reception, instead of the optical readout head 23, the recording stylus 32 is operated for reception. When the reception is over, the recording paper is stacked on the sheet discharge tray 39, and the sub-scanning base 40 is also returned to its starting position.

Wrapping of Recording Sheet around Drum 10

A basic function of the drum station and the sub-scanning station is to draw out a recording sheet by a feed roller 1 and to fix the leading end of the recording sheet to the drum 10 in rotation by a leading end clamp member 12 and also to clamp the trailing end of the recording sheet by a stopper 18 and a trailing end clamp member 11. An apparatus in which a sheet is fixedly wrapped around a drum by the leading end clamp member 12 and the trailing end clamp member 11 is described in detail in U.S. Pat. No. 4,033,575 patented July 5, 1977, entitled "Automatic Sheet Feed and Delivery Apparatus." With the recording sheet clamped, the drum 10 begins to be rotated at the main scanning speed to perform a main scanning, followed by a sub-scanning by the movement of the sub-scanning base 40. The sub-scanning base is provided with the readout head 23 and the recording stylus 32 for reading the subject original sheet and then effecting visual recording on the recording sheet, respectively.

The above-mentioned process is then followed by a sheet discharging step in which the recording sheet is detached from the drum 10 and is stacked on the sheet discharge tray 39 by a sheet discharge roller PE and a sheet feed out roller 42.

Driving Transmission

The drum station and the sub-scanning station have sheet discharging, main scanning and sub-scanning functions. At the time of the sheet feeding and sheet discharging, the drum 10 is driven by a sheet feed motor 37, and at the time of main scanning, the drum 10 is driven by a main motor 35. The sub-scanning base 40 is driven by the sub-scanning motor 26.

Readout Head 23

A light source illuminates the surface of an original sheet and a bounced light from the original sheet is condensed through a lens onto a surface of a photoelectric conversion element to convert the received light to an electric signal. Since the intensity of the bounced light varies with the image density of the original sheet, the image details are converted to varying electric signals.

Sheet Feed from Feed Roller 1 to Drum 10

(1) When the leading end of a sheet is brought into contact with a blade 17 which is rotatable about a shaft 17a, a rotatable light shielding plate 15, which is normally inserted into a light path of a photoelectric detector 16 comprising a light emitting element and a light receiving element, opens the light path, whereby the photoelectric detector 16 detects light and produces an ON signal. The sensor for detecting the leading end of a sheet comprising the blade 17, the light shielding plate 15 and the photoelectric detector 16 is generally represented by reference numeral 116 in FIG. 2. The sensor turns on or off a solenoid 27.

(2) The leading end clamp member 12 for clamping the leading end of a sheet, incorporated in the drum 10, is opened at a predetermined position by a signal from the solenoid 27, which is converted into a mechanical action, and at the same time, the trailing end clamp member 11 for clamping the trailing end of the sheet is opened.

(3) In such a condition as mentioned in (2), the drum 10 makes approximately a half turn, while a feed idler 4 is turned in the direction of the feed roller 1 with an appropriate timing cooperatively with the leading end clamp member 12 disposed on the drum 10 and is then stopped in contact with the feed roller 1. Since the feed roller 1 is continuously rotated by the sheet feed motor 37 when a sheet is fed and discharged, the sheet which has been stopped by the blade 17, waiting right under the feed roller 1, is inserted under the leading end clamp member 12 disposed on the drum 10 when the drum 10 comes by rotation to a predetermined leading end clamping position. Furthermore, since the peripheral speed of the feed roller is mechanically set at about 1.6 times as fast as that of the drum 10, the sheet runs after the leading end clamp member 12 so that the leading end of the sheet comes under the leading end clamp member 12. Under this condition, the drum 10 is continuously rotated and the leading end clamp member 12 is mechanically closed at a predetermined position. Thus, the leading end of the sheet is clamped on the drum 10. With a little time lag after this, the feed idler 4 is reset.

(4) The trailing end clamp member 11 which has been opened together with the leading end clamp member 12 is then stopped in engagement with the stopper 18 fixed to a side plate. The leading end clamp member 12, with the leading end of the sheet clamped thereby, continues to move past under the trailing end clamp member 11. When the leading end clamp member 12 comes to a position where the trailing end clamp member 11 has been waiting after about one revolution, the trailing end clamp member 11 is mechanically closed so that the trailing end of the sheet is clamped by the member 11.

(5) The sheet feed motor 37 is then stopped.

Main Scanning for Transmission and Reception

Referring now back to FIG. 1a, a worm wheel 36 is rotated by the main motor 35 through a worm. A driving shaft of the worm wheel 36 is connected to a drum shaft of the drum 10 through a rubber coupling 41. When the main motor 35 is started, the rubber coupling 41 is twisted and the diriving shaft of the drum 10 is driven with a little time lag behind the driving shaft due to the inertia of the drum 10. The rubber coupling 41 prevents the drum 10 from being driven suddenly, which may cause a disorder of a gear train consisting of the worm and the worm wheel 36 particularly when the main motor 35 is started. As the rotating speed of the drum 10 increases, the rubber coupling 41 becomes less twisted and finally the drum 10 gains the same speed as that of the diriving shaft of the worm wheel 36 and the rubber coupling 41 becomes free from distortion. In other words, the rubber coupling 41 attains a smooth rotation of the drum 10.

Reading Out and Recording Operation (1) The main motor 35 is started and the drum 10 is rotated at a main scanning speed.

(2) At the time of reception, a solenoid 28 is energized and a stopper 29 is pulled in the direction of the drum 10, whereby the recording stylus 32 is brought into contact with the drum 10. Thus, recording is made on a recording sheet wrapped around the drum 10.

At the time of transmission, reading out is performed from an original sheet wrapped around the drum 10.

(3) The sub-scanning motor 26 is started. The sub-scanning base 40 is moved along the guide means 24 at a sub-scanning speed, so that sub-scanning is performed.

(4) Referring to FIG. 1a, when an end position switch 33 is turned on or when a margin 19 is located in a position which makes an effective image area narrow, a switch 22 carried on the sub-scanning base 40 is turned on by the margin 19, whereby a sub-scanning is terminated. Referring to FIG. 2, the recording stylus 32 is mounted on a holder 31 and is detachable from a rotatable arm 30 by unloosening a screw 44. When the solenoid 28 is disenergized, the stopper 29 is turned counter-clockwise by a spring 49 and is brought into contact with a member 46, whereby the arm 30 is turned clockwise and the recording stylus 32 is retracted from the drum 10.

Sheet Discharge (1) The sheet discharge operation is the same as the sheet feed operation with respect to the drum 10 and related members thereof. The solenoid 27 is turned on or off. The main motor 35 is turned off and the sheet feed motor is turned on.

(2) With the switch 22 on, the sub-scanning motor 26 is started reversely and the sub-scanning base 40 is returned to its starting position and the sub-scanning motor 26 is stopped by a start position switch.

(3) An original sheet or a recording sheet clamped on the drum 10 is then discharged and stacked on the sheet discharge tray 39.

(4) The sheet feed motor 37 is stopped. Feeding and delivery of an original sheet or a recording sheet to the feed roller 1 is discussed below. FIG. 1b shows a schematic plan view of the feeding mechanism, and a side view of the sheet feeding mechanism is shown in the right half of FIG. 2. A driving mechanism of the sheet feeding mechanism of the sheet feeding mechanism is shown in detail in FIG. 13. A sheet feed station is located in front of the drum 10 and the feed roller 1. An original sheet or a recording sheet sheet is fed from the sheet feed station. The sheet feed station shown as an example in a series of the figures comprises delivery rollers, an air-separation apparatus, a recording sheet cassette and an original table for feeding original sheets manually. Thus, original sheets are manually fed, while recording sheets are automatically fed by the air-separation apparatus. Both the original sheets and the recording sheets are delivered to the drum 10 through the delivery rollers.

FIG. 3 shows the respective delivery courses of the original sheets and the recording sheets. As can be seen from FIG. 3, an original sheet 54 is placed on an original table 53 and is then fed from the original table 53, whereby a switch SW1 is turned on and successively the original sheet 54 is caught between separation rollers 51, 52, and is delivered to the feed roller 1 by the separation rollers 51, 52. The switch SW1 detects that the original sheet 54 is inserted. By this detection, the first original sheet 54 is delivered to the drum 10 by the feed roller 1. In case a second original sheet to be transmitted is likewise fed after the first original sheet 54, the second original sheet is caused to wait at a position under the feed roller 1.

In case of a recording sheet 56, the air-separation apparatus is energized by a call from a transmission side and the recording sheet 56 is fed to the separation rollers 51, 52 by an air-suction head (which will be described in detail later) so that the recording sheet 56 is delivered to the drum 10 by the feed roller 1. When another transmission follows after the first transmission, a second recording sheet is likewise fed to the separation rollers 51, 52 by the air-separation apparatus and delivered to the drum 10 by the feed roller 1 after the first recording sheet is discharged.

Original Sheet Feeding

Figure 4:
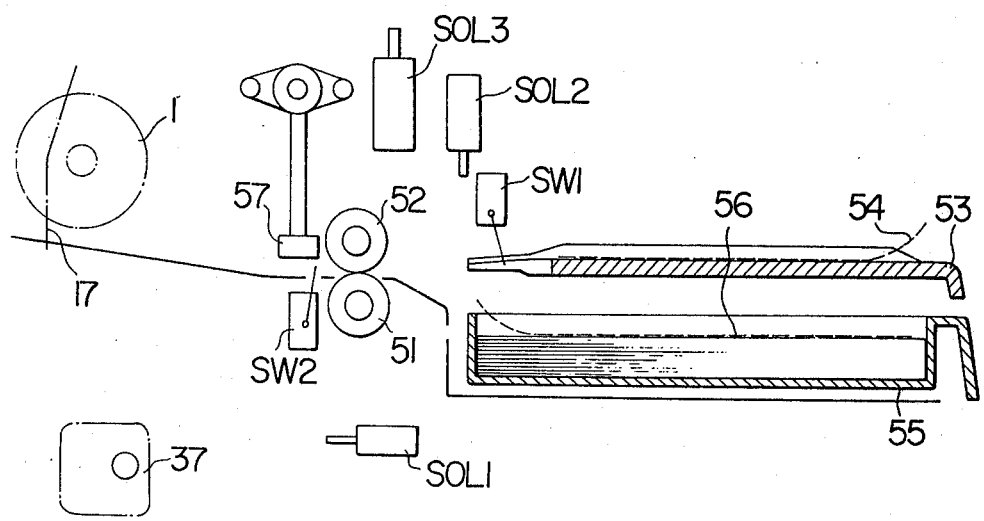
FIG. 4 is a schematic partial side elevation of the original sheet feed apparatus and the recording sheet feed apparatus of the facsimile apparatus, showing the outline of the sheet feeding operation.

Referring to FIG. 4, the sheet feed operation is discussed below.

Figure 5A:
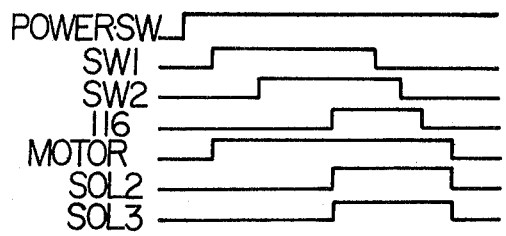
FIGS. 5a, 5b and 5c are time charts of each element shown in FIG. 4.

A. First original sheet (Its time chart for sheet feed operation is given in FIG. 5a.)

(1) Insertion of a first original sheet is detected by the switch SW1.

(2) The sheet feed motor 37 is started and the separation roller 51 is driven.

(3) The first original sheet is caught between the driving separation roller 51 and the driven separation roller 52 and is delivered in the direction of the feed roller 1.

(4) The presence of the first original sheet is detected by a switch SW2 and is then detected by the photoelectric detector 16 when the blade 17 is turned by the leading end of the original sheet. Thus, a clutch solenoid SOL2 and a separation solenoid SOL3 are energized. The separation roller 51 is disconnected from the sheet feed motor 37 by the clutch solenoid SOL2 so that the separation rollers 51, 52 are stopped. The separation roller 52 is disengaged from the separation roller 51 by the separation solenoid SOL3 so that the original sheet to be delivered by the feed roller 1 becomes free from any load. The original sheet is then fed to the drum 10 by the feed roller 1 and wrapped around the drum 10. The sheet feed motor 37 is stopped and the solenoids SOL2 and SOL3 are disenergized.

Figure 5B:
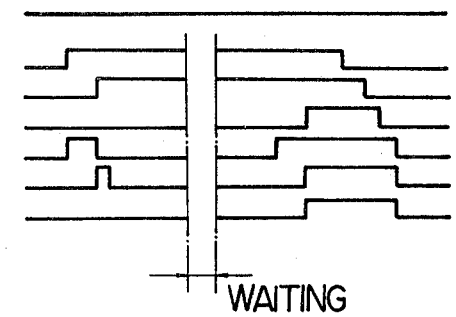

B. Successive Second Original Sheet (Its time chart is given in FIG. 5b.)

The successive second original sheet here means an original sheet to be transmitted immediately after the first original sheet.

(1) Same as in the above-mentioned steps (1), (2) and (3) of A.

(2) The presence of the second original sheet is detected by the switch SW2. Since the first original sheet is being transmitted, the clutch solenoid SOL2 is energized by the above-mentioned detection, and the separation roller 51 is stopped. However, since the first original sheet is still being transmitted, the second original sheet remains caught by the separation rollers 51, 52.

(3) When the transmission and discharging of the first original sheet have been finished, the sheet feed motor 37 is again energized by a feed signal transmitted from a control unit (not shown) so that the original sheet is delivered by the separation rollers 51, 52.

(4) Same as in step (4) of A.

Recording Sheet Feeding

Figure 5C:
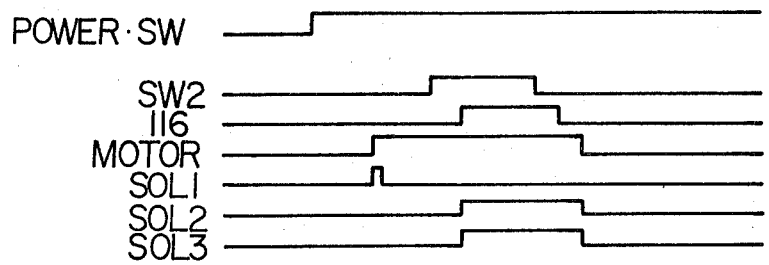

The time chart for recording sheet feeding is shown in FIG. 5c.

(1) The sheet feed motor 37 is energized by a sheet feed signal and the solenoid SOL1 is energized, whereby cam 58, 59, 60, 61 (refer to FIGS. 2, 6a, 6b and 6c) are connected to the sheet feed motor 37. By the cams 58 to 61, a sheet suction head 57 is moved over the recording sheet 56 and falls on the recording sheet 56. Thus, one recording sheet 56 is sucked to the sheet suction head 57 and is moved upward and is then carried to a rest position by the sheet suction head 57, with the result that the leading end of the recording sheet 57 is inserted between the separation rollers 51, 52.

(2) When the presence of the recording sheet 56 is detected by the photoelectric detector 16 through the blade 17, the same operation as in (4) of A is carried out.

Figure 6A:
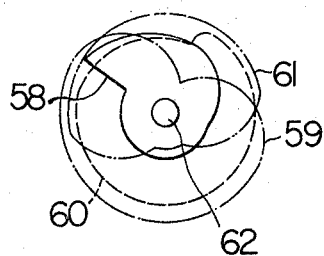
Figure 6B:
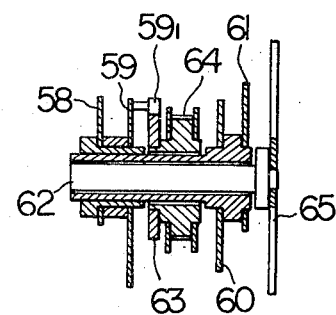

Referring to FIGS. 6a to 6d, the relationship between the operation of the cams 58 to 61 and that of the sheet suction head 57 is as follows. FIG. 6a is a schematic elevation of the cams 58 to 51. FIG. 6b is a side elevation of the cams of FIG. 6a. FIG. 6c is an exploded view of the cams. The cam group comprises a vacuum cams 58, a slide cam 59, a separate cam 60 and a lift cam 61, together with a ratchet wheel 63 and a ratchet pawl $59_1$. The cam group is connected to the sheet feed motor 37 through a cam pulley 64.

The vacuum cam 58 is a cam for producing a negative pressure inside a vacuum cylinder 66 to be applied to the sheet suction head 57.

The slide cam 59 is a cam for moving the sheet suction head 57 from its rest position onto the recording sheet 56.

The separate cam 60 makes it easy for the recording sheet 56 to be caught between the separation rollers 51, 52 by separating the driven separation roller 52 from the driving separation roller 52 through rotating a separation shaft 102 of the driven separation roller 52.

The lift cam 61 serves to lift the sheet suction head 57 after it is placed on the recording sheet.

The respective movements of these cams are shown in the form of a diagram in FIG. 6d, wherein the sheet suction head 57 is first moved over the recording sheet 56 by the slide cam 59, and is descended on the recording sheet 56 by the lift cam 61, and a negative pressure is applied to the sheet suction head 57 through the vacuum cam 58 and the recording sheet 56 is sucked to the sheet suction head 57 and is lifted by the lift cam 61 and is then moved in the direction of its rest position by the slide cam 59, and during this movement, the recording sheet 56 is inserted between the separation rollers 51, 52 which are separated by the separate cam 60. When the sheet suction head 57 returns to its rest position, the separation rollers 51, 52 are brought in pressure contact with each other by the separate cam 60. Thus, the recording sheet 56 is caught between the separation rollers 51, 52.

Figure 7A:
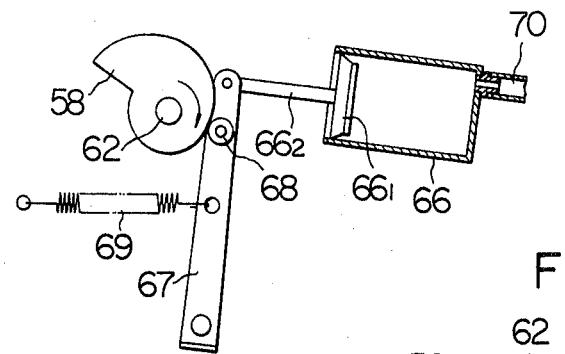
FIGS. 7a, 7b, 7c, 8a, 8b, 9a, 9b and 9c are schematic side elevations showing the operation of each cam.
Figure 7B:
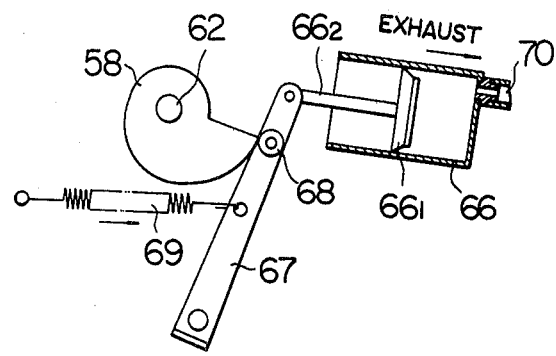
Figure 7C:
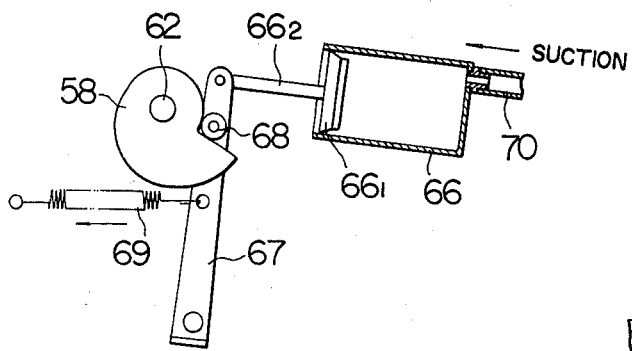

FIGS. 7a, 7b and 7c show a negative pressure formation mechanism comprising the vacuum cam 58 and the vacuum cylinder 66. At the cam angle shown in FIG. 7a, since a lever 67 pulls a piston rod $66_2$ through a spring 69, a piston $66_1$ is at the top dead center. Reference numeral 68 represents a cam roller and reference numeral 70 a hose. The hose 70 is connected to a vacuum pipe 71 which is connected to the sheet suction head 57. When the cam group is driven by the action of the cam clutch in accordance with a sheet feed signal, the vacuum cam 58 is turned so as to take such a position as shown in FIG. 7b. At this moment, the piston $66_1$ is at the bottom dead center. When the vacuum cam 58 is further rotated, the piston $66_1$ is lifted by the force of the spring 69, and at the same time, a great negative pressure is applied to the hose 70, the vacuum pipe 71 and the sheet suction head 57. The recording sheet 56 is sucked to the sheet suction head 57.

Figure 8B:
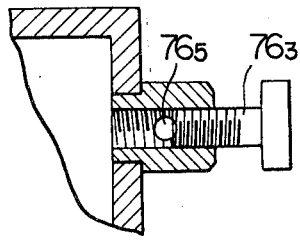
Figure 8A:
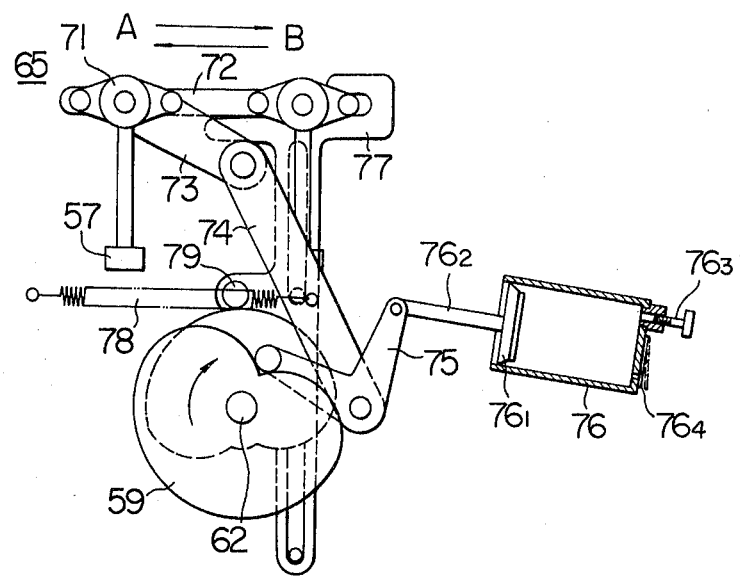

Referring to FIG. 8a, there is shown a slide mechanism of the sheet suction head 57. A support member of the vacuum pipe 71 is fitted in and guided by a slit 72 of a side plate 65. Furthermore, the support member can be moved in both directions A and B by the rotation of the slide cam 59 through a slide idler lever 73, a slide lever 74 and a slide cam lever 75. A represents the rest position of the sheet suction head 57, and B represents a position of the head 57 on the recording sheet 56. When the support member of the vacuum pipe 71 is moved to the position B, the support member is moved on a lift 77 and can be moved upwards and downwards by the upward and downward movements of the lift 77. The slide lever 74 is always given a bias by a spring 78 so as to return the vacuum pipe 71 to the rest position A. Therefore, there is a fear that the pipe 71 returns to the rest position A so fast that it brings about a great shock. Thus, a piston rod $76_2$ of a damper cylinder 76 is connected to the slide cam lever 75. A piston $76_1$ of the damper cylinder 76 can be moved easily in the forward direction since an elastic valve $76_4$ is opened, but the backward movement of the piston $76_1$ becomes heavy since the elastic valve $76_4$ is closed and air is sucked only through an air inlet $76_5$ narrowed by an adjustment screw $76_3$ (refer to FIG. 8b which is an enlarged sectional view of a portion of the adjustment screw $76_3$). The return of the slide lever 74 is controlled thus, with the result that the return of the vacuum pipe 71 is made smooth with reduced shocks and vibrations.

When the support member of the vacuum pipe 71 is moved onto the lift 77 by the rotation of the slide cam 59, the lift cam 61 which has lifted a cam roller 79 of the lift 77 as shown at position B in FIG. 8a is retracted.

Figure 9C:
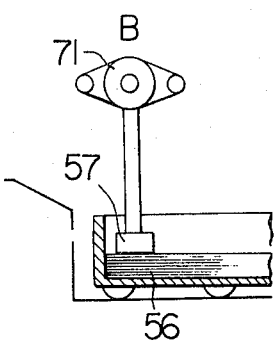
Figure 9A:
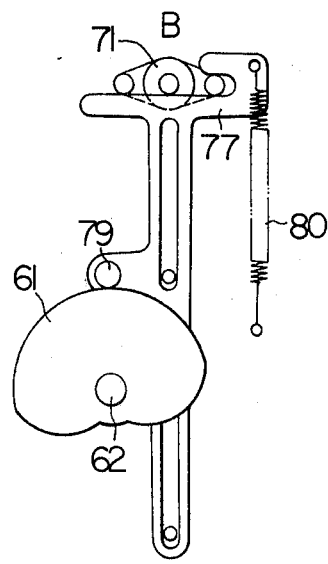
Figure 9B:
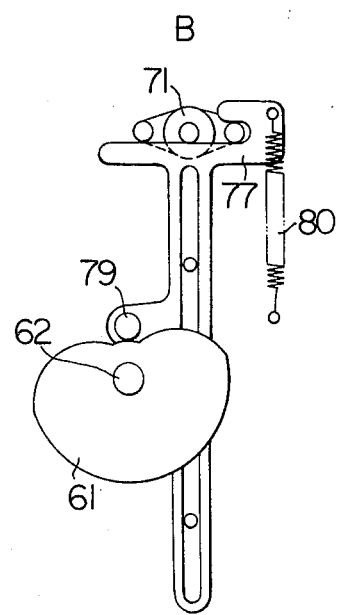

The position of the lift cam 61 at B in FIG. 8a is separately shown in FIG. 9a. When the lift cam 61 is further rotated, the lift 77 is moved downwards by a spring 80 as shown in FIG. 9b, and the sheet suction head 57 connected to the vacuum pipe 71 is brought into close contact with the recording sheet 56 as shown in FIG. 9c. At this moment, a negative pressure of the vacuum cylinder 66 is applied to the sheet suction head 57 through the hode 70, so that the recording sheet 56 is sucked to the sheet suction head 57. When the lift cam 61 is further rotated, the lift 77 is moved upwards, and at the uppermost position of the lift 77, the slide lever 74 (refer to FIG. 8a) is turned by the slide cam 59 so that the vacuum pipe 71 is moved in the direction of the rest position A. By this time, the separation rollers 51, 52 have been separated by the separate cam 60. Therefore, when the vacuum pipe 71 is returned to the rest position A, another recording sheet is inserted between the separation rollers 51, 52.

Figure 10A:
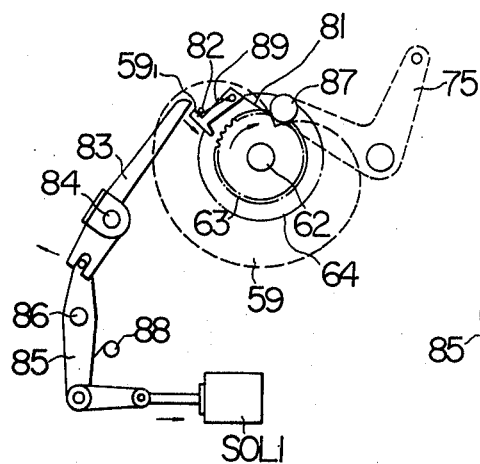
FIGS. 10a and 10b are a schematic side elevation of a clutch with a different operating position.
Figure 10B:
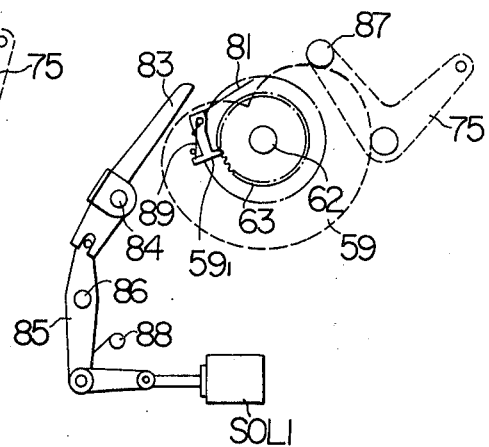

The sheet feeding is thus made by the respective rotations of a group of the cams 58 to 61, and the cam rotations are performed by engaging the ratchet pawl $59_1$ (refer to FIG. 6b) in the ratchet wheel 63 through energizing the cam solenoid SOL1. The ratchet pawl $59_1$ is attached to the slide cam 59 and is given a bias by spring means and is engaged in the ratchet wheel 63 against the bias by the cam solenoid SOL1. FIG. 10a shows the relationship between the action of the solenoid SOL1 and the cam clutching by the ratchet pawl 59. The ratchet wheel 63 is fixed to a cam pulley 64 and is always rotated by the sheet feed motor 37. As mentioned above, the ratchet pawl $59_1$ is attached to the slide cam 59 and is positioned away from the ratchet wheel 63 at the rest position (refer to FIG. 10a) since a plate spring 81 is pushed by a cam roller 87 of the slide cam lever 75.

When the cam solenoid SOL1 is energized by a sheet feed signal, a cam clutch lever 83 is turned so that the ratchet pawl $59_1$ is pressed against and engaged in the ratchet wheel 63. When the ratchet pawl $59_1$ is engaged in the ratchet wheel 63, the slide cam 59 begins to be rotated integral with the cam pulley. When the cams 59, 58, 60, 61 are rotated, the plate spring 81 is retracted from the cam roller 87 and becomes free and a cam clutch spring 89 acts so as to press the ratchet pawl $59_1$ against the ratchet wheel 63.

When the slide cam 59 is rotated and the cam roller 87 again treads on the plate spring 81, since the force of the plate spring is greater than that of the cam clutch spring 89, the ratchet pawl $59_1$ is retracted from the ratchet wheel 63, so that the clutching is released and the cams 58 to 61 are stopped. Thus, one rotation clutching is performed.

Figure 11A:
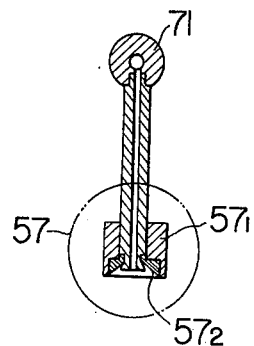
FIGS. 11a, 11b, 11c, 12a and 12b show a negative pressure route of a suction head; particularly
Figure 11B:
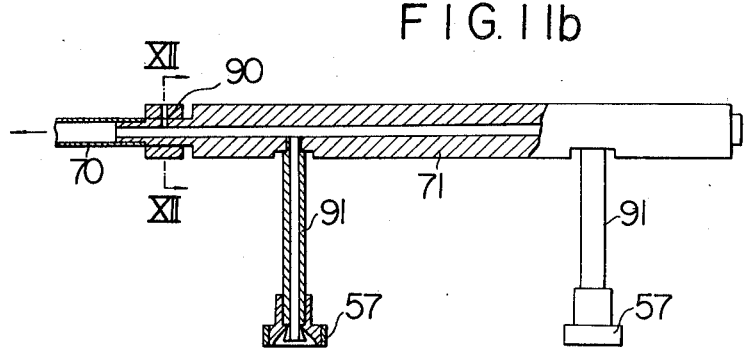
Figure 11C:
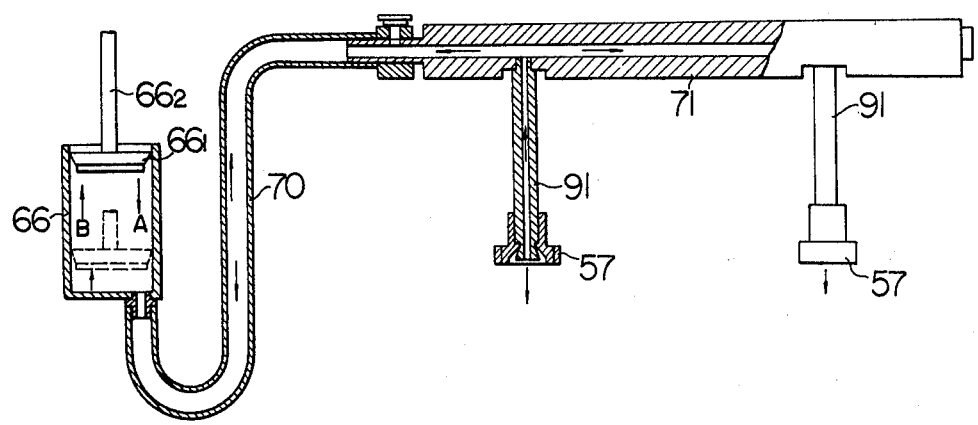
Figure 12A:
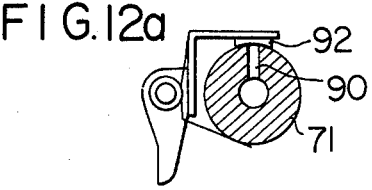
Figure 12B:
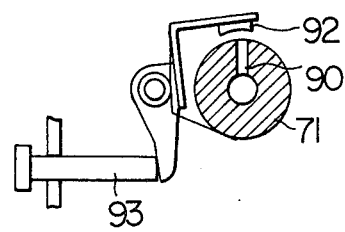

FIGS. 11a, 11b and 11c show the details of the vacuum pipe 71 and the sheet suction head 57. FIG. 11a is a schematic sectional side elevation of the vacuum pipe 71 and the sheet suction head 57; FIG. 11b is a partial cutaway front elevation of FIG. 11a. The sheet suction head 57 and the vacuum pipe 71 are connected through a sucker pipe 91, and the sheet suction head 57 consists of a sheet holder $57_1$ and a sucker $57_2$. The vacuum pipe 71 has an air outlet 90 for negative pressure. As shown in FIG. 12a, the air outlet 90 is normally closed by a packing 92 with a spring pressure applied thereto. FIG. 12a is an enlarged section taken on line XII—XII in FIG. 11b. When the vacuum pipe 71 is located at the rest position A (refer to FIG. 8a), the air outlet 90 is opened by the center of a stop screw 93 being pressed as shown in FIG. 12b. Therefore, when the sheet suction head 57 with the recording sheet 56 sucked thereto is returned to the rest position A, air enters the vacuum pipe 71 through the air outlet 90, whereby the suction force of the sheet suction head 57 is nullified. Accordingly, the negative pressure of the vacuum cylinder 66 is also nullified. Air with a positive pressure formed by a piston $66_1$ of the cylinder 66 is discharged from the sheet suction head 57.

Figure 14:
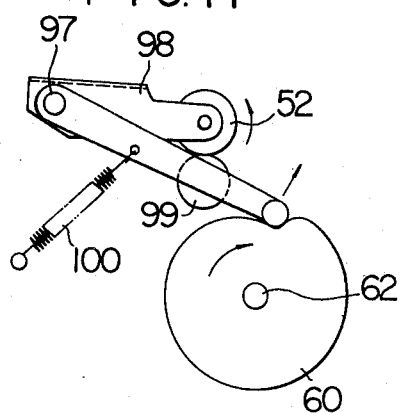
FIG. 14 is a schematic side elevation of the driving separation roller and a driven separation roller in combination of a cam.
Figure 13:
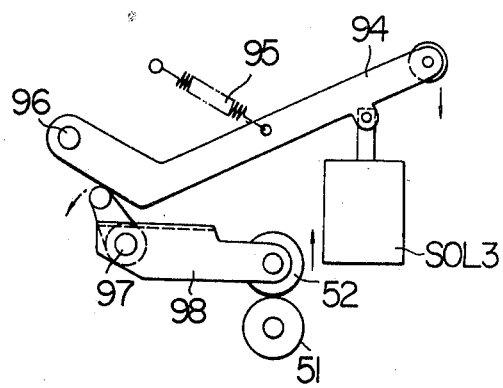
FIG. 13 is a schematic side elevation of the sheet feed rollers comprising a driving separation roller and a driven separation roller, showing their engagement mechanism.

FIG. 13 shows a mechanism which separates the separation roller 51 from the driven separation roller 52. The driven separation roller 52 is held in a bracket 98. The bracket 98 is rotatable about a separation shaft 97. Normally a lever 94 is given a counterclockwise bias about a shaft 96 by a spring 95, whereby the separation roller 52 is brought into pressure contact with the separation roller 51. When the solenoid SOL3 is energized, the lever 94 is urged clockwise, so that the separation roller 52 is separated from the roller 51. The roller 52 can also be separated from the roller 51 by manually pushing the lever 94 downwards. Since the rollers 51, 52 can be opened manually as well as automatically, the separation of the roller 52 can be automatically controlled, and furthermore, at the time of original sheet feeding, an original sheet which has been inserted between the rollers 51, 52 can be pulled out by pushing the lever 94. Furthermore, the roller 52 can be separated from the roller 51 by the separate cam 60 (refer to FIG. 6c). FIG. 14 shows a combination of the above-mentioned method. When the separate cam 60 is rotated, a lever 99 is gradually lifted and accordingly the bracket 98 is lifted. Such operation is made at the time of previously mentioned automatic feeding of the recording sheets.

Figure 15A:
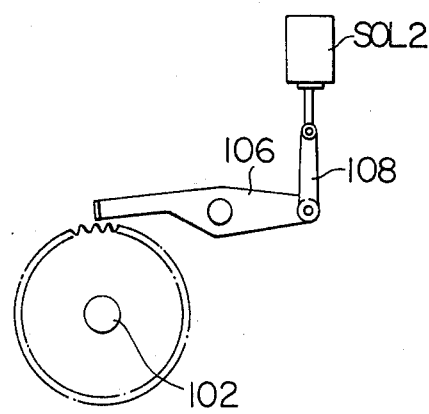
FIG. 15a is a schematic side elevation of a clutch control mechanism of the driven separation roller.
Figure 15B:
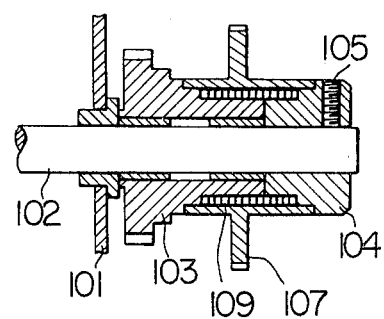

FIG. 15a shows a clutch control mechanism for stopping the separation roller 51; FIG. 15b shows the details of such clutch control mechanism. In the clutch mechanism of FIG. 15b, a driving spring clutch 103 is always rotated integral with a transmission gear through an idler gear, while a driven spring clutch 104 is fixed by the separation shaft 102 and a set-screw 105.

When a clutch stop lever 106 is away from a sleeve 107, the clutch is in a connecting condition so that the separation shaft 102 is rotated. By a stopping signal, the clutch solenoid SOL2 is energized, whereby a solenoid lever 108 is lifted, and a pawl of the clutch stop lever 106 is moved downwards and is engaged in the sleeve 107, with the result that the rotation of the sleeve 107 is stopped and at the same time the clutch is disconnected and the rotation of the separation shaft 102 is stopped. In order to heighten an accuracy of the stopping position of the separation shaft 102, the number of the teeth of the sleeve 107 is increased.

Both ends of a clutch spring 109 are fixed to the driven spring clutch 104 and the sleeve 107. The driving spring clutch 103 is designed such that the outer diameter of the driving spring clutch 103 is slightly larger than that of the clutch spring 109. When the sleeve 107 is in rotation, since the clutch spring 109 clamps the driving spring clutch 103 tightly, the clutch is connected. However, when the rotation of the sleeve 107 is stopped, since the clutch spring 109 is loosened, the driving spring clutch 103 is rotated, slipping the clutch spring 109. Thus, the clutch is disconnected.

Figure 16:
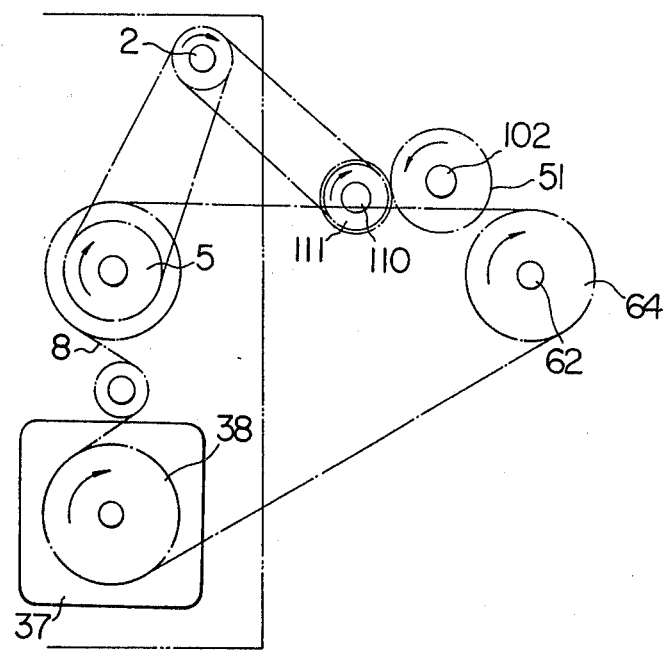
FIG. 16 is a schematic side elevation of a driving system for the sheet feed station in the right half portion of FIGS. 1b and 2.

FIG. 16 shows a driving system for the sheet feed station, wherein reference numeral 110 represents an idler shaft; reference numeral 111 an idler pulley; reference numeral 112 gears in which the gears of the driving spring clutch 103 is engaged.

Figure 17:
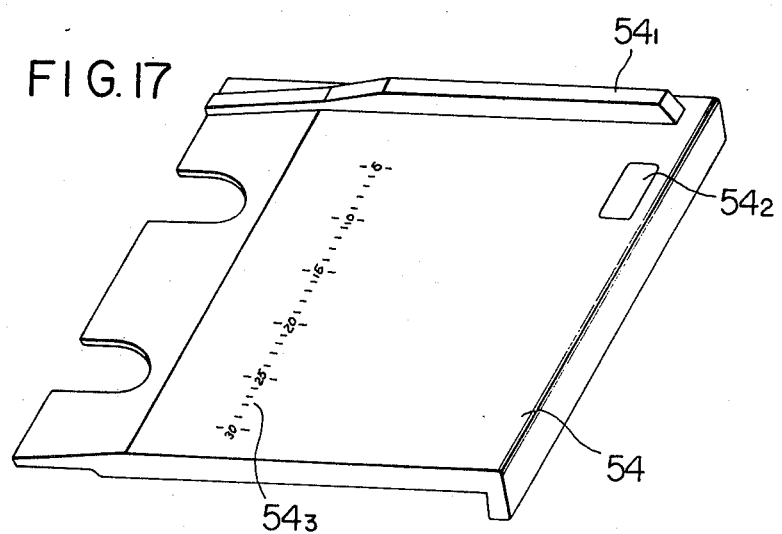
FIG. 17 is a perspective view of the original table of FIG. 1b.

Referring to FIG. 17, there is shown the original table 53 for manual feeding of original sheets. In the original table 53 are formed an original sheet guide $53_1$, a window $53_2$ for looking at the residual recording sheets in the cassette 55 and a scale $53_3$.

In the present embodiment, since a cassette for the original sheets is disposed under the original table 53, notches are formed through which the sheet suction head 57 can be passed.

Figure 18B:
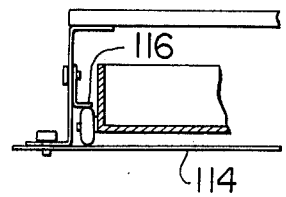
Figure 18A:
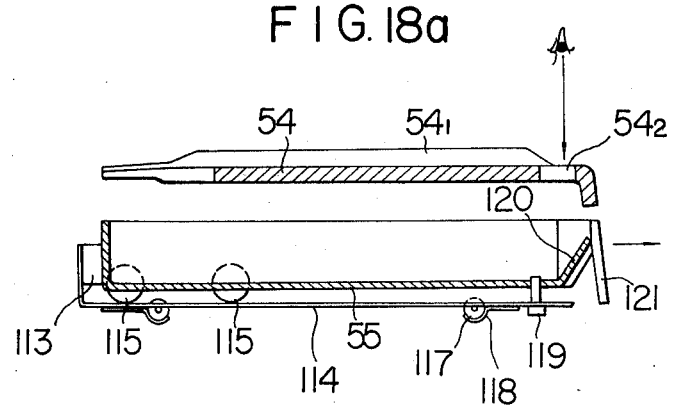
FIG. 18a is a schematic sectional side elevation of a cassette.

FIG. 18a is a schematic sectional side elevation of a cassette 55, and FIG. 18b is a partial sectional front elevation of the cassette 55. The design of the cassette 55 is such that it can be pulled out and when set for use, it is fixed to a base 114 by a rubber magnet 113 attached to the rear end of the cassette 55. Furthermore, since drawing rollers 115 are provided so as to be rotated between the base 114 and drawing roller guides 116, the cassette 55 can be pulled out smoothly. When the cassette 55 is drawn out, the drawing rollers 115 are caused to pass through the friction rollers (frictions are given by a plate spring 118) attached to the base 114. At this moment, the friction rollers 117 click, and at the same time the drawn cassette 55 is semifixed there.

The cassette 55 can be drawn out up to a position where the drawing rollers 115 are brought into contact with a stop screw 119. The recording sheets are placed in the cassette 55 at the position where it is drawn out most. At this moment, since the cassette 55 is semi-fixed by the friction rollers 117 and the stop screw 119, it does not move, so that it is easy to set the recording sheets in the cassette. The residual recording sheets can be seen by a mirror 120 disposed inside the cassette 55. In order to make it easy to see the mirror 120, the transparent window $54_2$ is formed in part of the original table 53. Reference numeral 121 represents a handle.

In case the cassette 55 is disposed right under the original table 53, a lid of the cassette 55 can be used as an original table, or the original table can be used as a lid of the cassette.

What is claimed is:

1. In a compact facsimile apparatus having an original/recording sheet support, means for moving the support, an image readout unit for reading an image to be transmitted from an original on the support, an image forming unit for placing an image to be received onto a recording sheet on the support, and means for moving the image readout and image forming units in unison with respect to the support to respectively read or form an image sheet feed apparatus, comprising only one sheet feed roller operable to transport both originals and recording sheets individually to the original/recording sheet support, an original sheet table for the manual guiding and feeding of original sheets individually to said one sheet feed roller when an image is to be transmitted from an original sheet, a cassette for holding a stack of recording sheets, said original sheet table fixed in a position above said cassette and forming a cover for said cassette and recording sheet feed means operable to feed recording sheets individually from said cassette to said one sheet feed roller when an image is to be received and placed on a recording sheet, said one sheet feed roller being located in a position capable of receiving both original sheets from said original sheet table and recording sheets from said cassette.

2. In a facsimile apparatus, a sheet feed apparatus as claimed in claim 1 wherein said original sheet table has a notch therein adjacent an edge thereof closest said one sheet feed roller, said recording sheet feed means passing through said notch of said original sheet table for bringing said recording sheet feed means into contact with a recording sheet in said cassette when an image is to be received and placed on a recording sheet.

3. In a facsimile apparatus, a sheet feed apparatus according to claim 2, wherein said recording sheet feed means comprises a sheet suction head movable through said notch when an image is to be received and placed on the moving sheet.

4. In a facsimile apparatus, a sheet feed apparatus as claimed in claim 1, including roller means and guide means supporting said cassette for pulling said cassette out of beneath said original sheet table.

5. In a facsimile apparatus, a sheet feed apparatus, as claimed in claim 1, including an original sheet guide for guiding original sheets with images to be transmitted, formed on one side of said original sheet table, and a window formed in said original sheet table for checking recording sheets remaining in said cassette.

6. In a facsimile apparatus, a sheet feed apparatus as claimed in claim 1, in which said recording sheet feed means is a sheet suction head, and a slide mechanism operable to move said sheet suction head selectively between a rest position, retracted from the stack of recording sheets in said cassette, and a suction position on the stack of recording sheets.

7. A sheet feed apparatus, for use with a facsimile apparatus having a reading and a printing station, comprising: sheet feed roller means operable to transport both original sheets and recording sheets individually to said reading and said printing stations; an original sheet table for manually feeding of original sheets individually to said sheet feed roller means; a cassette for holding a stack of recording sheets therein; said original sheet table fixed in position above said cassette; and recording sheet feed means operable to feed recording sheets individually from said cassette to said sheet feed roller means, said recording sheet feed means comprising a sheet suction head, and a slide mechanism operable to move said sheet suction head selectively between a rest position, retracted from the stack of recording sheets in said cassette, and a suction position on a stack of recording sheets; said sheet feed roller means being located in a position capable of receiving both original sheets, from said original sheet table, and recording sheets, from said cassette; said slide mechanism comprising a vacuum pipe connected to said sheet suction head mounted for horizontal sliding motion for moving said suction head between said rest position and said suction position, a slide lever connected to said vacuum pipe, and a rotatably mounted slide cam engaged with said slide lever for moving said suction head between said rest and suction positions with the rotation of said slide cam, and drive means connected to said slide cam for rotating said slide cam.

8. A sheet feed apparatus according to claim 7, further including a vacuum cylinder connected to said vacuum pipe having a piston, a pivotally mounted vacuum lever connected to said vacuum piston for establishing a partial vacuum in said vacuum pipe through the movement of said vacuum piston and a rotatably mounted vacuum cam engaged with said vacuum lever, said drive means connected to said vacuum cam for the rotation thereof to establish a partial vacuum at said suction head through said vacuum pipe when said suction head is at said suction position.

9. A sheet feed apparatus according to claim 8, further including a lift member mounted for vertical sliding motion between a raised position and a lowered position, a rotatably mounted lift cam engaged with said lift member for sliding said lift member between its raised and lowered position, said vacuum pipe engaged with said lift member when said suction head is in said suction position, said lift cam connected to said drive means for lowering said lift member into its lowered position when said vacuum pipe is engaged with said lift member for bringing said suction head into engagement with recording sheets in said cassette, said drive means rotating said vacuum cam to establish a partial vacuum at said suction head when said lifting member is in its lowered position.

10. A sheet feed apparatus according to claim 9, further including damping means connected to said slide lever for damping the motion of said vacuum pipe as said suction head moves into said rest position and a biasing spring connected to said slide lever for biasing said suction head into said rest position.

11. A sheet feed apparatus according to claim 10, wherein said sheet feed roller means comprises a pair of rollers, one roller being pivotally mounted for movement toward and away from the other roller, a separation lever connected to said pivotally mounted roller, a rotatable separator cam engaged with said separator lever, said separator cam connected to said drive means for the rotation thereof for separating said pair of rollers.

* * * * *